United States Patent [19]

Suzuki et al.

[11] Patent Number: 4,664,894
[45] Date of Patent: May 12, 1987

[54] MICRONIZED ZIRCONIA AND METHOD FOR PRODUCTION THEREOF

[75] Inventors: Takehiko Suzuki, Ohtsu; Shigemi Osaka; Norikazu Aikawa, both of Himeji, all of Japan

[73] Assignee: Nippon Shokubai Kagaku Kogyo Co., Ltd., Osaka, Japan

[21] Appl. No.: 762,961

[22] Filed: Aug. 6, 1985

[30] Foreign Application Priority Data

Aug. 7, 1984 [JP] Japan ................................ 59-164284
Jun. 13, 1985 [JP] Japan ................................ 60-127161

[51] Int. Cl.$^4$ ............................................. C01G 25/02
[52] U.S. Cl. ...................................... 423/265; 423/608
[58] Field of Search ........................ 423/265, 266, 608

[56] References Cited

U.S. PATENT DOCUMENTS 3,514,252  5/1970  Levy et al. ........................... 423/608
4,520,114  5/1985  David ................................. 423/608
4,543,341  9/1985  Barringer et al. .................... 423/608

Primary Examiner—H. T. Carter
Attorney, Agent, or Firm—Omri M. Behr

[57] ABSTRACT

A method for the production of micronized zirconia by the addition of an alkali to an aqueous solution of a zirconium salt or to a mixed aqueous solution of said zirconium salt and a stabilizer such as yttrium, calcium, and magnesium compounds, which method comprises carrying out the reaction for formation of a hydroxide by the addition of the alkali continuously in a flow type reaction system while keeping the pH of said reaction system at a fixed level, separating the hydroxide produced consequently by the reaction, and drying and calcining the separated hydroxide, and a zirconia-containing micronized particle which contains such stabilizer and has an average particle diameter of not more than 0.02 $\mu$m.

8 Claims, 3 Drawing Figures

MICRONIZED ZIRCONIA AND METHOD FOR PRODUCTION THEREOF

BACKGROUND OF THE INVENTION

1. Field of the Invention

This invention relates to micronized zirconia and to a method for the production thereof. More particularly, this invention relates to a zirconia type micronized particle having an average particle diameter of not more than 20 nm.

2. Description of the Prior Art

Zirconia occurs in three crystal structures, i.e. monoclinic system, tetragonal system, and cubic system. Since zirconia exhibits characteristic properties such as resistance to corrosion, toughness, and oxygen ion-conducting property invariably at levels not found in other materials, it has found utility in variety of applications such as oxygen sensors, electronic parts, and refractory materials. As a material of high performance, zirconia is expected to attract growing respect.

A method for producing micronized zirconia by treating a mixed aqueous solution of a zirconium salt and a salt of a stabilizing agent with an alkaline substance such as ammonia thereby causing coprecipitation of hydroxides of elements involved and calcining the hydroxides has been widely known to the art. The conventional coprecipitation method disclosed as in Japanese Patent Publication No. SHO 54(1979)-23,365, Japanese Patent Publication No. SHO 57(1979)-25,523, or Japanese Patent Laid-open No. SHO 57(1982)-191,234 effects the relevant reactions batchwise. It comprises in adding aqua ammonia to a mixed aqueous solution of a zirconium salt and a salt of a stabilizing element until the pH of the solution reaches a prescribed level thereby causing precipitation of hydroxides. This method for batchwise production of micronized zirconia inevitably entails the following disadvantages.

(i) When the aqueous solution of such a zirconium salt as zirconium oxychloride or zirconium nitrate is neutralized with an alkali such as aqua ammonia to produce zirconium hydroxide through the ensuing phenomenon of precipitation, the resultant micronized zirconia has its particle diameter varied with the pH of the solution during the reaction. When the aforementioned neutralization and the attendant precipitation are effected batchwise, the pH of the solution widely varies when the reaction is started and when it is completed and the produced micronized zirconium hydroxide depends on the time-course change of the pH of the solution during the reaction. The particle diameter of the powder, therefore, is distributed over a wide range.

(ii) In the neutralization-coprecipitation reaction which comprises adding a water-soluble salt of such a stabilizing element as yttrium, calcium, or magnesium to an aqueous solution of such a zirconium salt as zirconium oxychloride or zirconium nitrate thereby producing a mixed aqueous solution and then allowing an alkali such as aqua ammonia to react upon the mixed aqueous solution thereby causing coprecipitation of hydroxides in the mixed aqueous solution, the different components in the solution are precipitated in different pH ranges. Where the pH of the solution widely varies when the reaction is started and when it is completed as in the conventional batchwise reaction system, therefore, the hydroxides of different components are fractionally precipitated. The precipitate eventually obtained, accordingly, possesses a heterogeneous composition.

Zirconium ions are completely precipitated even when the pH of the solution is in the acidic zone, whereas yttrium ions or calcium ions or magnesium ions are not completely precipitated until the pH of the solution becomes alkaline. When the hydroxides are sequentially precipitated by gradually adding aqua ammonia to the aforementioned mixed aqueous solution, which is acidic in nature, thereby varying the pH of the solution in the range of from 8 to 12 in accordance with the conventional batchwise reaction system, therefore, zirconium hydroxide is first precipitated and the hydroxide of the stabilizer is subsequently precipitated. The mixing of these two hydroxides is effected exclusively by agitation. As a natural consequence, the composition has insufficient homogeneity. There are times when the micronized composition, because of insufficient homogeneity, is required to undergo an extra treatment such as wet mixing.

An object of this invention, therefore, is to provide a novel method for the production of micronized zirconia.

Another object of this invention is to provide a method for the production of micronized zirconia of uniform composition and particle diameter.

Yet another object of this invention is to provide a zirconia-containing micronized particle having an average particle diameter of not more than 20 nm.

SUMMARY OF THE INVENTION

The objects described above are accomplished by a method for the production of micronized zirconia by the addition of an alkali to an aqueous solution of a zirconium salt or to a mixed aqueous solution of the zirconium salt and a compound of at least one metal selected from the group consisting of yttrium, calcium, and magnesium, which method comprises carrying out the reaction for formation of a hydroxide by the addition of the alkali continuously in a flow type reaction system while keeping the pH of the reaction system at a fixed level, separating the hydroxide produced consequently by the reaction, and drying and calcining the separated hydroxide.

These objects are also accomplished by a zirconia-containing micronized particle which contains an oxide of at least one metal selected from the group consisting of yttrium, calcium, and magnesium in a concentration of not more than 0.5 mol based on 1 mol of the zirconia and has an average particle diameter of not more than 20 nm.

DESCRIPTION OF PREFERRED EMBODIMENT

The zirconium salt to be used in the invention may be any of zirconium salts which are soluble in water. Typical examples of the zirconium salts answering this description are zirconium oxychloride, zirconium oxynitrate, zirconium nitrate, zirconium chloride and zirconium sulfate.

Figure 1:
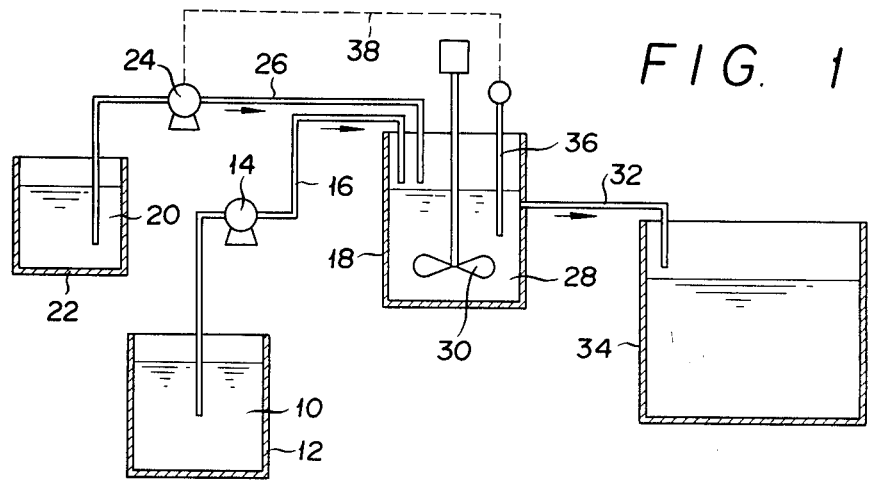
FIG. 1 is a flow sheet illustrating a typical procedure for working the method of this invention.

The method of this invention is effected by carrying out the reaction for formation of precipitate continuously in a flow type reaction system. The reaction in the flow type system is attained as illustrated in FIG. 1, for example, by forwarding an aqueous solution 10 of a zirconium salt optionally containing a stabilizer by a metering pump 14 in a fixed flow volume from a supply tank 12 through a pipe 16 into a reactor 18 and, at the same time, forwarding an alkali 20 by a metering pump from an alkali tank 22 through a pipe 26 into the reactor 18, stirring a reactant solution 28 in the reactor 18 with a stirrer 30 to effect reaction while keeping the pH of the reactant solution 28 within a fixed range, and continuously discharging the resultant solution through a conduit 32 into a storage tank 34 in such a rate that the liquid volume within the reactor 18 remains constant. Within the reactor 18, the zirconium salt and the optionally incorporated stabilizer in the aqueous solution are educed and suspended in the form of finely divided particles of hydroxides owing to the pH adjustment by the addition of the alkali. The suspension so produced in the form of sol is continuously discharged and then left aging in the storage tank to complete the reaction. In this case, the pH of the reactant solution is kept within the aforementioned fixed range by measuring the pH of the reactant solution 28 with a pH meter 36, converting the value of the pH so measured into an electric signal, feeding the electric signal through a line 38 to the metering pump 24, and thereby controlling the amount of supply of the alkali. When the capacity of the reactor 18 is minimized, the reaction can be effectively carried out by forwarding the raw materials with a turbulent pipe such as a line mixer of homomixer, for example.

In accordance with this method, the produced fine particles have extremely high particle diameter homogeneity because the reaction can be carried out while the operational conditions for the reaction such as pH, concentrations of reactant and resultant solutions, retention time, and degree of stirring are maintained constant. The precipitate produced during the reaction possesses extremely uniform texture because the pH of the solution within the reactor can be fixed substantially at a level proper for coprecipitation of zirconium ions and the ions of the stabilizer. Thus, the fine powder consequently obtained enjoys outstanding uniformity of composition.

For the sake of the micronization and for the convenience of the operation of reaction, the concentration of the zirconium salt in the solution is desired to be as low as permissible. For the improvement of productivity, however, this concentration may be heightened. When the concentration of the solution increases, the resultant solution gains in viscosity and loses in fluidity. Thus, the concentration of the zirconium salt calculated as $ZrO_2$ is selected below about 2 mols/liter, desirably in the range of 0.01 to 1.0 mols/liter, and preferably in the range of 0.01 to 0.5 mols/liter. Since the reaction for the formation of the aforementioned suspension belongs to the category of high-speed reaction, the speed of supply of the aqueous solution and the average retention time are not specifically restricted from the standpoint of reaction and are only required to remain within the respective ranges proper for the mixed condition of the reactant solution within the reactor to remain uniformly.

The stabilizer which is used when necessary is a water-soluble compound of at least one metal selected from the group consisting of yttrium, calcium, and magnesium. Typical examples of the stabilizer are yttrium chloride, yttrium bromide, yttrium nitrate, yttrium carbonate, calcium chloride, calcium bromide, calcium carbonate, calcium nitrate, magnesium chloride, magnesium bromide, magnesium carbonate, and magnesium nitrate. The concentration of the stabilizer calculated as oxide ($Y_2O_3$, CaO, or MgO) is not more than 0.5 mol, more desirably 0.02 to 0.3 mol, based on one mol of the zirconium salt (calculated as $ZrO_2$).

Examples of the alkali to be used for the pH adjustment include hydroxides of alkali metals such as sodium hydroxide, potassium hydroxide, and lithium hydroxide besides ammonia. Since such hydroxides of alkali metals call for much time and labor in the washing of the coprecipitate, ammonia is used most advantageously. The pH of the reactant solution is in the range of 6.0 to 13.0. When the pH is less than 6.0 but is not less than 3.0, zirconium hydroxide are formed, but finely divided particles cannot be obtained. The region for the formation of hydroxides of the stabilizer mainly falls on the alkali side. When the aqueous solution contains the stabilizer, therefore, the pH within the reactor is set on the alkali side. When the stabilizer is also desired to be precipitated, the pH is desired to be regulated within the range of 7.5 to 12.5. During the formation of hydroxides, the pH is desired to be regulated $\pm 0.5$. Where the produced fine powder is expected to possess particularly uniform particle diameter and composition, of pH regulation is required to be accurate within $\pm 0.2$.

The type of reactor is not specifically limited, except for the requirement that the reactor should permit the continuous operation. Since the reactant solution gains in viscosity in direct proportion to the concentration, however, the reactor is desired to be of a type provided with a stirred and, therefore, enabled to retain the stirred condition constantly.

Preparatory to the reaction, the reactor filled with a prescribed amount of pure water in the reactor is adjusted to a desired pH with ammonia or hydrochloric acid, for example. Then, aqua ammonia and the reactant solution which is an acidic aqueous solution are introduced simultaneously as by metering pumps at fixed flow rates into the reactor. The pH of the reactants in the reactor is kept at a fixed level by having the flow rates of the two aqueous solutions kept constant as regulated by the pH meter disposed in the reactor or by suitably adding an acid or an alkali separately prepared. The resultant solution is discharged by a metering pump or an overflow so that the amount of the reactant solution will remain constant. The hydroxide in the discharged resultant solution is separated by filtration and washed with water. The cleaned hydroxide is then dehydrated to dryness by the use of an organic solvent or by means of spraying, calcined at a temperature in the range of 400° to 1,200° C., preferably 800° to 1,000° C., for a period of 0.5 to 5 hours, preferably 0.2 to 2 hours, and finally micronized.

The primary particle diameter of the powder obtained as described above is not more than 0.05 μm. The individual particles of the powder are uniform. In powder, the stabilizer now in the form of yttrium oxide ($Y_2O_3$), calcium oxide (CaO), or magnesium oxide (MgO) is dispersed in extremely high uniformity. Thus, the micronized zirconia so produced proves to be a highly suitable powder for the production of zirconia particles for shaping of high density, high strength, and high toughness. Particularly, the micronized zirconia which contains the oxide of at least one metal selected from the group consisting of yttrium, calcium, and magnesium in a concentration of 0.01 to 0.5 mol, preferably 0.02 to 0.3 mol, per mol of zirconia possesses a highly uniform average particle diameter of not more than 0.02 μm, preferably in the range of 0.005 to 0.015 μm. It has been ascertained to the inventors that when the high-density micronized zirconia type composition having a particle diameter of not more than 0.02 μm is dispersed in a transparent sheet or film substrate of glass or plastic or when a coating film containing the zirconia is applied on the surface of the transparent substrate, the properties such as strength, resistance to chemicals, resistance to heat, resistance to water, and resistance to weather conditions are notably improved because the characteristic properties such as high refractive index and high strength which are possessed by zirconia are utilized advantageous in conferring upon the transparent substrate such functions as preventing reflection and enhancing absorption of ultraviolet light. This discovery has lent itself to completion of the present invention.

EXAMPLE 1

A reaction tank provided with a stirrer was filled with 300 ml of water. The water in the reaction tank was circulated through an overflow pipe by the operation of a seal-less pump. The water was adjusted to pH 5.0 by addition of hydrochloric acid. An aqueous solution containing zirconium oxychloride in a concentration of 0.3 mol/liter was fed of a rate of about 40 ml per minute and aqua ammonia (an aqueous 28 wt% ammonia solution) at a rate of 40 ml per hour respectively by metering pumps to the reaction tank while under stirring and, at the same time, part of the reactant solution in the reaction tank was released through an overflow pipe. The neutralization and the attendant precipitation were continued by this flow type reaction system. The pH of the reactant solution within the reaction tank was kept in the range of 5.0±0.2 during the course of the reaction by fine adjustment of the flow rates of the two aqueous solutions. The hydroxide in the overflowing liquid was separated by filtration and washed with water to expel ammonium chloride and washed with acetone to expel water. The resultant hydroxide was dried at 120° C. for 20 hours and then calcined at 800° C. for one hour. Consequently, there was obtained micronized zirconia having an average particle diameter of 0.08 μm, containing particles of 0.07 to 0.09 μm in a combined proportion of more than 80%, and having a specific surface area of 12 m$^2$/g.

EXAMPLE 2

A reaction tank provided with a stirrer was filled with 300 ml of water. The water in the reaction tank was adjusted to pH 8.0 by addition of aqua ammonia. An aqueous solution containing zirconium oxychloride in a concentration of 0.3 mol/liter was fed at a rate of about 50 ml per minute and aqua ammonia (an aqueous 28 wt% ammomia solution) at a rate of 50 ml per hour respectively while under stirring into the reaction tank. Thereafter, the procedure of Example 1 was followed, except that the neutralization and the attendant precipitation were carried out with the pH kept in the range of 8.0±0.2. Consequently, there was obtained micronized zirconia having an average particle diameter of 0.04 μm, containing particles of 0.03 to 0.05 μm in a combined proportion of more than 85%, and having a specific surface area of 23 m$^2$/g.

EXAMPLE 3

A mixed aqueous solution containing yttrium chloride in a concentration of 3 mol% as $Y_2O_3$ and zirconium oxychloride in a concentration of 0.2 mol/liter as $ZrO_2$ was prepared. In a reaction tank provided with a stirrer, 300 ml of water was placed and adjusted to pH 8.5 by addition of aqua ammonia. The mixed aqueous solution was fed at a rate of about 50 ml per minute and aqua ammonia (an aqueous 28 wt% ammonia solution) at a rate of 50 ml per hour respectively by metering pumps, while under stirring, to the reaction tank. The resultant solution was discharged by a separate metering pump so that the amount of the reactant solution within the reaction tank would be kept constant. Thus, the reaction for neutralization and coprecipitation was continuously carried out. During the course of the reaction, the flow rates of the mixed aqueous solution and the aqua ammonia were finely adjusted so as to keep the pH in the range of 8.5±0.2. The hydroxide in the discharged resultant solution was separated by filtration and then washed with water to expel ammonium chloride.

Figure 2:
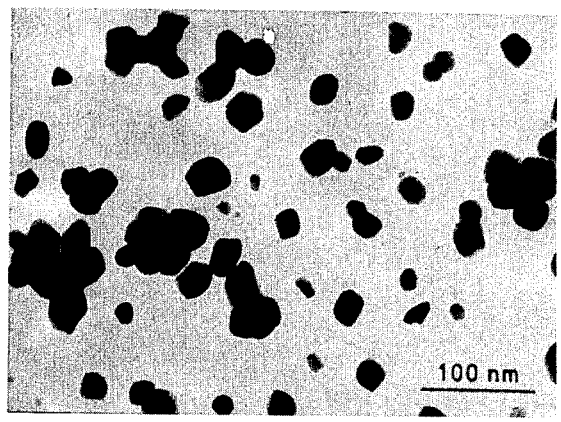
FIGS. 2 through 3 are electron photomicrographs showing typical crystal structures of the micronized zirconia produced by this invention.

The hydroxide so obtained was dispersed in n-butanol. The dispersion was distilled under atmospheric pressure until 105° C. to effect dehydration. Subsequently, the n-butanol dispersion containing the dehydrated oxide was spray dried to afford a powder of high fluidity. By calcining this powder at 850° C. for one hour, there was obtained micronized zirconia containing 3 mol% of yttria and containing no discernible cluster. This micronized composition had an average particle diameter of 0.03 μm, contained particles of 0.02 to 0.04 μm in a combined proportion of more than 80%, and had a specific surface area of 47 m$^2$/g. By observation under an analytical electron microscope, this fine powder was found as shown in FIG. 2 to have $Y_2O_3$ dispersed with high uniformity, contain particles of even diameter, and excel in sintering property.

EXAMPLE 4

A mixed aqueous solution containing calcium chloride ($CaCl_2.6H_2O$) in a concentration 8 mol% as CaO and zirconium oxychloride in a concentration of 0.2 mol/liter as $ZrO_2$ was prepared. A coprecipitated hydroxide was obtained by following the procedure of Example 3, except that the pH was kept in the range of 12.5±0.2 using aqueous sodium hydroxide solution (2.0N) as the alkali. The hydroxide thus obtained was washed by water untill sodium iron was free. The hydroxide obtained after the dehydration and drying treatment similar to those of Example 3 was calcined at 900° C. for one hour. Consequently, there was obtained micronized zirconia containing 8 mol% of CaO and containing no discernible cluster. This fine powder had an average particle diameter of 0.04 μm. By observation under an analytical electron microscope, this fine powder was found to have CaO dispersed with high uniformity, have a particle diameter distribution in a narrow range, and excel in sintering property.

EXAMPLE 5

A mixed aqueous solution containing magnesium chloride ($MgCl_2.6H_2O$) in a concentration of 7 mol% as MgO and zirconium oxychloride in a concentration of 0.2 mol/liter as $ZrO_2$ was prepared. A coprecipitated hydroxide was obtained by following the procedure of Example 3, except that the pH was kept in the range of 10.5±0.2. In this case, the flow rate of the aqua ammonia was about 55 ml per hour. The hydroxide obtained after the dehydration and drying treatments similar to those of Example 3 was calcined at 950° C. for one hour. Consequently, there was obtained micronized zirconia containing 7 mol% of MgO and containing no discernible cluster. This fine powder had an average particle diameter of 0.05 μm. By observation under an analytical electron microscope, this fine powder was found to have MgO dispersed with extremely high uniformity, have a particle diameter distribution in a narrow range, and excel in sintering property.

EXAMPLE 6

A mixed aqueous solution containing yttrium chloride in a concentration of 8 mol% as $Y_2O_3$ and zirconium oxychloride in a concentration of 0.2 mol/liter as $ZrO_2$ was prepared. In a reaction tank provided with a stirrer, 300 ml of water was placed and adjusted to pH 9.0 by addition of aqua ammonia. The mixed aqueous solution was fed at a rate of 50 ml per minute and aqua ammonia (aqueous 10 wt% ammonia solution) at a rate of about 3 ml per minute respectively by metering pumps, while under stirring, to the reaction tank. The ensuing reaction for neutralization and coprecipitation was carried out continuously while the resultant solution was discharged from the reaction tank by a separate metering pump so as to keep constant the amount of the reactant solution in the reaction tank. During the course of this reaction, the flow rate of the aqua ammonia was finely adjusted so as to keep the pH in the range of 9±0.2. The hydroxide in the discharged resultant solution was separated by filtration and then washed with water to expel ammonium chloride.

Figure 3:
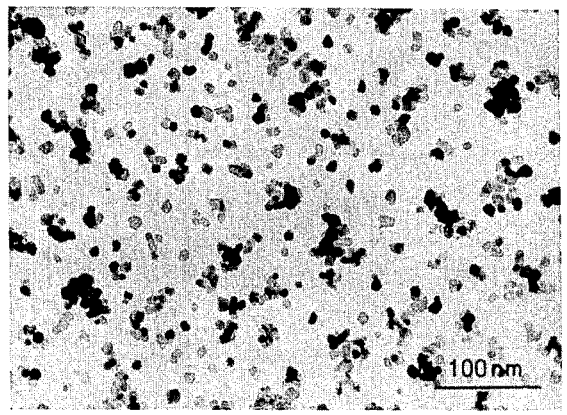

The hydroxide so obtained was dispersed in n-butanol. The dispersion was distilled under atmospheric pressure until the solution temperature rose to 105° C. to effect dehydration. It was then dried under a vacuum at 60° C. and subsequently calcined at 850° C. for one hour. In a ball mill having an inner volume of 2 liters, 120 g of the powder so obtained and 750 ml of toluene were milled for six hours and then dried. Consequently, there was obtained a fine powder of inconspicuous secondary aggregation. This fine powder had a BET specific surface area of 96 $m^2/g$ and an average particle diameter of 10.5 nm. An electron photomicrograph of the fine powder is shown in FIG. 3.

EXAMPLE 7

A fine powder was prepared by following the procedure of Example 6, except that the $Y_2O_3$ content of the mixed aqueous solution was changed to 30 mol%. The fine powder so produced had a BET specific surface area of 154 $m^2/g$ and an average particle diameter of 6.5 nm.

CONTROL 1

Micronized zirconia was prepared by the conventional neutralization and coprecipitation method as follows.

In 1 liter of water, 64.5 g of zirconium oxychloride and 3.64 g of yttrium chloride were dissolved to produce a mixed aqueous solution containing zirconium oxychloride in a concentration of 0.2 mol/liter as $ZrO_2$. After the preparation, the mixed aqueous solution had a pH of 1.1. Aqua ammonia was added dropwise to the mixed aqueous solution while under stirring, to give rise to hydroxide. The dropwise addition of the aqua ammonia was stopped when the pH of the solution reached 8.5. The hydroxide was separated by filtration, washed with water, then dispersed in n-butanol, and distilled under atmospheric pressure until the temperature of the solution rose to 105° C. to effect dehydration. Subsequently, the product in the liquid phase was recovery by centrifugal separation, dried, and calcined at 850° C. for one hour. Consequently, there was obtained micronized zirconia containing 3 mol% of $Y_2O_3$ and containing no discernible cluster.

The fine powder so obtained had an average particle diameter of 0.06 μm. By observation under an electron microscope, this fine powder was found to have particle diameters distributed over a fairly wide range of 0.03 μm to 0.2 μm. The results of analysis by use of an analytical electron microscope indicate that the distribution of $Y_2O_3$ was considerably varied from one particle to another.

REFERENTIAL EXPERIMENT 1

In a ball mill of alumina, powdered silicon nitride having a purity of 98% by weight and having an average particle diameter of 0.8 μm, 5% by weight of stabilized zirconia obtained as a fine powder in Example 6, 2% by weight of polyvinyl alcohol, and a small amount of water were wet mixed for 10 hours. The slurry consequently obtained was pelletized by a spray drier and the pellets were subjected to rubber press molding under pressure of 1,000 kg/$cm^2$ to afford bar-shaped molded articles 10 mm in diameter and 50 mm in length. When the molded articles were calcined under a current of nitrogen at 1,650° C. for four hours, there was obtained sintered articles of 97% density to theoretical one.

REFERENTIAL EXPERIMENT 2 (CONTROL)

Sintered articles indicated below were obtained by following the procedure of Referential Experiment 1, except that the average particle diameter of the stabilized micronized zirconia was 0.5 μm and the calcining temperature was changed as shown below.

| Calcining temperature (°C.) | Density to theoretical density (%) |
| --- | --- |
| 1,600 | 91 |
| 1,750 | 95 |

REFERENTIAL EXPERIMENT 3

In a ball mill of alumina, a partially stabilized zirconia powder (containing 3 mol% of $Y_2O_3$) having an average particle diameter of 0.5 μm, 5% by weight of partially stabilized zirconia obtained in the form of fine powder in Example 3 and intended herein as a sintering aid, 1% by weight of polyvinyl alcohol, and a small amount of water were wet mixed for 10 hours. The slurry consequently obtained was molded after the manner of Referential Experiment 1. The molded articles consequently produced were calcined in a current of air at 1,350° C. for two hours. Consequently, there were obtained sintered articles having 99.5% density to theoretical one.

For comparison, the procedure described above was repeated, except that the addition of the micronized zirconia of Example 3 was omitted. The sintered article finally produced has only a 90% density to theoretical one.

What is claimed is:

1. A method for the production of micronized zirconia by the addition of an alkali to an aqueous solution of a zirconium salt or to a mixed aqueous solution of said zirconium salt and a compound of at least one metal selected from the group consisting of yttrium, calcium, and magnesium, which method comprises carrying out the reaction for formation of a hydroxide by the addition of the alkali continuously in a flow type reaction system while keeping the pH of said reaction system adjusted accurately within ±0.5 of the fixed level in the range of 6.0 to 13.0, separating the hydroxide produced consequently by the reaction, washing with water to remove the alkali salt followed by dehydrating and drying with an organic solvent and subsequently spray drying and calcining the separated hydroxide.

2. A method according to claim 1, wherein the concentration of said zirconium salt (calculated as $ZrO_2$) is not more than about 2 mols/liter.

3. A method according to claim 2, wherein the concentration of said zirconium salt (calculated as $ZrO_2$) is in the range of 0.01 to 1.0 mol/liter.

4. A method according to claim 1, wherein the pH is adjusted accurately within ±0.2 of the fixed level.

5. A method according to claim 1, wherein said alkali is ammonia.

6. A method according to claim 1, wherein said compound of at least one metal selected from the group consisting of yttrium, calcium, and magnesium is contained in a concentration of not more than 0.5 mol as oxide, based on 1 mol of said zirconium salt calculated as $ZrO_2$.

7. A method according to claim 6, wherein said compound is contained in a concentration of 0.02 to 0.3 mol as oxide, based on 1 mol of said zirconium salt calculated as $ZrO_2$.

8. A method for the production of micronized zirconia by the addition of an alkali to an aqueous solution of a zirconium salt or to a mixed aqueous solution of said zirconium salt and a compound of at least one metal selected from the group consisting of yttrium, calcium, and magnesium, which method comprises carrying out the reaction for formation of a hydroxide by the addition of the alkali continuously in a flow type reaction system while keeping the pH of said reaction system adjusted accurately within +0.5 of the fixed level in the range of 6.0 to 13.0, separating the hydroxide produced consequently by the reaction, washing with water to remove the alkali salt and drying and dehydrating the separated hyroxide in anhydrous lower alkanol and calcining to provide zirconia particles of average particle diameter of not more than 0.05 $\mu$m, having an average particle size variation not exceeding 0.02 $\mu$m.

* * * * *